(12) United States Patent
Tang et al.

(10) Patent No.: US 11,403,357 B2
(45) Date of Patent: Aug. 2, 2022

(54) ENHANCING ACCURACY OF PRESENTED SEARCH KEYWORDS

(71) Applicant: Advanced New Technologies Co., Ltd., George Town (KY)

(72) Inventors: Yili Tang, Hangzhou (CN); Yuan Fang, Hangzhou (CN); Zimo Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 147 days.

(21) Appl. No.: 15/835,113

(22) Filed: Dec. 7, 2017

(65) Prior Publication Data
US 2018/0095979 A1 Apr. 5, 2018

Related U.S. Application Data

(63) Continuation of application No. PCT/CN2016/085399, filed on Jun. 12, 2016.

(30) Foreign Application Priority Data

Jun. 19, 2015 (CN) .......................... 201510346513.2

(51) Int. Cl.
*G06F 17/00* (2019.01)
*G06F 7/00* (2006.01)
(Continued)

(52) U.S. Cl.
CPC .......... *G06F 16/9537* (2019.01); *G06F 16/00* (2019.01); *G06F 16/3322* (2019.01);
(Continued)

(58) Field of Classification Search
CPC .. G06F 16/9537; G06F 16/00; G06F 16/3322; G06F 16/90324; G06F 17/18; H04W 4/024; H04W 4/029; H04W 4/02
See application file for complete search history.

(56) References Cited

U.S. PATENT DOCUMENTS 8,239,130 B1 8/2012 Upstill et al.
8,775,570 B2 * 7/2014 Sandholm .......... G06Q 30/0631
709/200
(Continued)

FOREIGN PATENT DOCUMENTS

CN 102999513 3/2013
CN 103399966 11/2013
(Continued)

OTHER PUBLICATIONS

European Extended Search Report in European Application No. 16810955.1, dated Jan. 17, 2019, 12 pages.
(Continued)

*Primary Examiner* — Pavan Mamillapalli
(74) *Attorney, Agent, or Firm* — Fish & Richardson P.C.

(57) ABSTRACT

Multiple geographic grids are generated according to acquired location information of a service provider. Each geographic grid contains one or more service providers. The second region matching the target location information is a geographic grid for a region defined by the target location information. A presentation request for a search page is received. The presentation request includes target location information. A keyword is acquired that has a search popularity meeting a first condition in a first region matching the target location information, and the acquired keyword is used as a first keyword. The first keyword is provided for presentation in the search page.

20 Claims, 7 Drawing Sheets

(51) Int. Cl.
  *G06F 16/9537* (2019.01)
  *G06F 16/9032* (2019.01)
  *H04W 4/029* (2018.01)
  *H04W 4/024* (2018.01)
  *G06F 16/00* (2019.01)
  *G06F 16/332* (2019.01)
  *G06F 17/18* (2006.01)
  *H04W 4/02* (2018.01)

(52) U.S. Cl.
  CPC ........ *G06F 16/90324* (2019.01); *G06F 17/18* (2013.01); *H04W 4/02* (2013.01); *H04W 4/024* (2018.02); *H04W 4/029* (2018.02)

(56) References Cited

U.S. PATENT DOCUMENTS

| | | | |
|---|---|---|---|
| 9,264,484 | B1* | 2/2016 | Moxley .................. H04L 67/02 |
| 9,311,416 | B1* | 4/2016 | Goel ..................... G06F 16/2228 |
| 9,424,342 | B1* | 8/2016 | Ravichandran ..... G06F 16/9537 |
| 9,529,867 | B1* | 12/2016 | Blevins ................. G06F 16/248 |
| 2005/0192999 | A1* | 9/2005 | Cook .................. G06F 16/9566 |
| | | | 707/E17.115 |
| 2009/0138445 | A1* | 5/2009 | White .................... G06Q 30/02 |
| | | | 707/E17.014 |
| 2011/0173217 | A1* | 7/2011 | Kasperski ........... G06F 16/3322 |
| | | | 707/767 |
| 2013/0073541 | A1 | 3/2013 | Mehanna et al. |
| 2013/0073686 | A1* | 3/2013 | Sandholm ........... G06F 16/9537 |
| | | | 709/219 |
| 2013/0132359 | A1* | 5/2013 | Lee ....................... G06F 16/332 |
| | | | 707/706 |
| 2013/0159331 | A1* | 6/2013 | Zhang .................... G06F 16/00 |
| | | | 707/758 |
| 2013/0282750 | A1* | 10/2013 | Paul ...................... G06F 16/334 |
| | | | 707/767 |
| 2014/0207748 | A1* | 7/2014 | Sood .................... G06F 16/9537 |
| | | | 707/706 |
| 2014/0207795 | A1 | 7/2014 | Zhou |
| 2014/0214819 | A1* | 7/2014 | Aitchison ........... G06F 16/9535 |
| | | | 707/724 |
| 2014/0351255 | A1 | 11/2014 | Choi et al. |
| 2015/0120772 | A1 | 4/2015 | Cui et al. |

FOREIGN PATENT DOCUMENTS

| | | |
|---|---|---|
| CN | 103455160 | 12/2013 |
| CN | 103744940 | 4/2014 |
| CN | 103916476 | 7/2014 |
| CN | 104166700 | 11/2014 |
| CN | 104572846 | 4/2015 |
| CN | 104615715 | 5/2015 |
| CN | 104679787 | 6/2015 |
| JP | 06187373 A | 7/1994 |
| JP | 2004355286 | 12/2004 |
| JP | 2010009315 | 1/2010 |
| JP | 2010287048 | 12/2010 |
| JP | 2012094142 | 5/2012 |
| JP | 2012146264 | 8/2012 |
| JP | 2015057694 | 3/2015 |
| KR | 20090056679 | 6/2009 |

OTHER PUBLICATIONS

International Search Report issued by the International Searching Authority in International Application No. PCT/CN2016/085399 dated Aug. 31, 2016; 9 pages.
Search Report and Written Opinion by the Intellectual Property Office of Singapore issued in Singaporean Application No. 11201710362Q, dated Aug. 27, 2018, 11 pages.
Wikipedia.com [online], "Geohash,"available on or before Jun. 14, 2015, via Internet Archive: Wayback Machine URL<https://web.archive.org/web/20150614143913/https://en.wikipedia.org/wiki/geohash>, [retrieved on Jun. 14, 2015], retrieved from: URL<https://en.wikipedia.org/wiki/geohash>, 4 pages.
Wikipedia.com [online], "TF-IDF," available on or before Dec. 15, 2012, via Internet Archive: Wayback Machine URL<https://web.archive.org/web/20121110224446/https://en.wikipedia.org/wiki/Tf-idf>, [retrieved on Nov. 12, 2012], retrieved from: URL<https://en.wikipedia.org/wiki/Tf-idf>, 2 pages.
PCT International Preliminary Report on Patentability in International Application No. PCT/CN2016/085399, dated Dec. 12, 2017, 9 pages (with English translation).
PCT Written Opinion of the International Searching Authority in International Application No. PCT/CN2016/085399, dated Aug. 31, 2016, 8 pages (with English translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

US 11,403,357 B2

ENHANCING ACCURACY OF PRESENTED SEARCH KEYWORDS

This application is a continuation of PCT Application No. PCT/CN2016/085399, filed on Jun. 12, 2016, which claims priority to Chinese Patent Application No. 201510346513.2, filed on Jun. 19, 2015, and each application is incorporated by reference in its entirety.

BACKGROUND

The present application relates to the field of communication technologies, and in particular, to enhancing the accuracy of presented search keywords. With the rapid development of Internet technologies, more and more people search for and acquire various types of information using the Internet. For example, a user can search for information by using a search engine associated with a mobile device (such as a smart phone) or a non-mobile device (such as, a personal computer (PC)). Improved search techniques can improve user search experiences.

SUMMARY

The present disclosure describes enhancing accuracy of presented search keywords. In an implementation, multiple geographic grids are generated according to acquired location information of a service provider. Each geographic grid contains one or more service providers. The second region matching the target location information is a geographic grid for a region defined by the target location information. A presentation request for a search page is received. The presentation request includes target location information. A keyword is acquired that has a search popularity meeting a first condition in a first region matching the target location information, and the acquired keyword is used as a first keyword. The first keyword is provided for presentation in the search page.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, different keywords can be presented to each user on the basis of the different locations of the users. Second, the use of personalized keyword presentation can enhance the accuracy of keyword presentation and can further improve search experiences for the user. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes enhancing accuracy of presented search keywords, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In conventional searching, when a user performs search operations, popular or trending keywords can be presented to the user in a search page to allow the user to search and search for results related to the popular or trending keywords. However, the presented keywords are usually static in nature and have no particular association with the user (for example, location, personal attributes, and search history). As a result, searching using a conventionally-presented keyword usually provides general/low-accuracy search results to a user. The present disclosure provides a keyword presentation solution, which can enhance the accuracy of one or more search keywords presented to a user.

Figure 1:
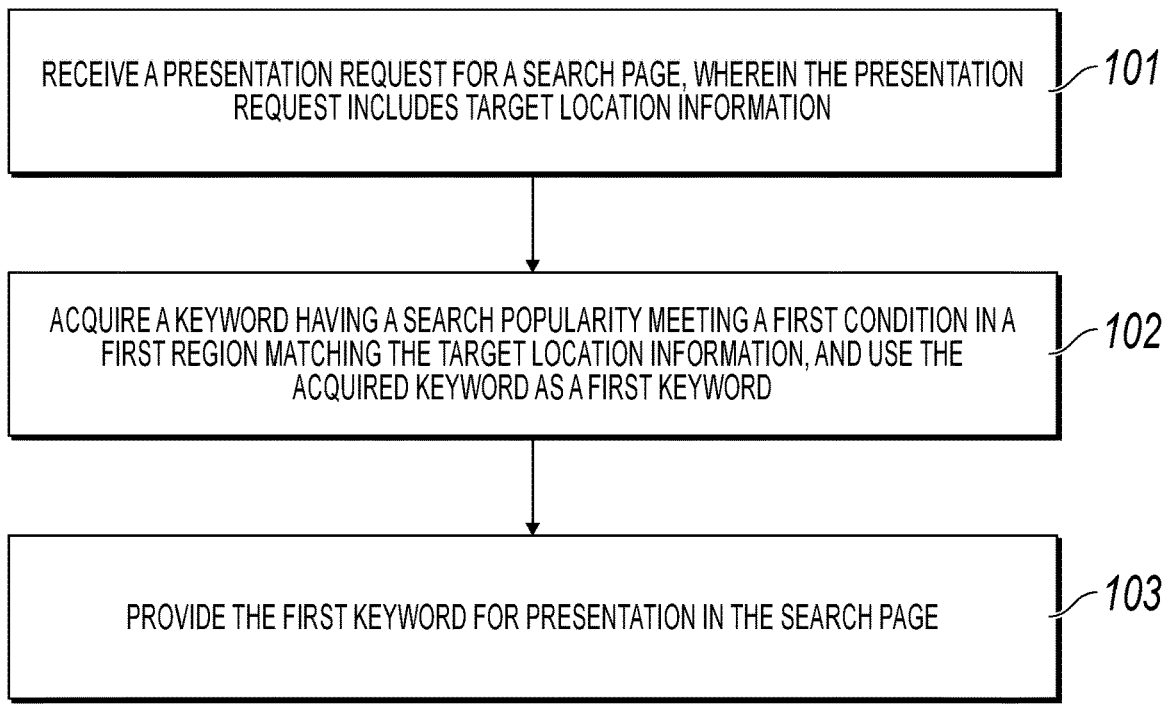
FIG. 1 is a flowchart illustrating an example of a keyword presentation method, according to an implementation of the present disclosure.

FIG. 1 is a flowchart illustrating an example of a keyword presentation method 100, according to an implementation of the present disclosure. The keyword presentation method 100 may be applied to a server, and include the following steps:

At 101, a presentation request for a search page is received, and the presentation request includes target location information. For example, a user using a terminal (such as a mobile computing device, a personal computer, or other computer device) may perform an action, such as entering a search query, that results in the generation of a presentation request for a search page. After generation of the request, the terminal may acquire current location information, such as a current Global Positioning System (GPS) location of the terminal. The terminal can then include the current location information as target location information to be included with the presentation request for the search page that is sent to a server. In some implementations, the user may also self-define the target location information, such as identifying a current location in response to a prompt. For example, the terminal can acquire location information selected or provided by the user. The location information that is selected or provided by the user can be the target location information that is included in the presentation request for the search page that is sent to the server. From 101, method 100 proceeds to 102.

At 102, a keyword having search popularity meeting a first condition in a first region matching the target location information is acquired and is used a first keyword. For example, the first region can be a geographic grid for a region defined by the target location information, such as a region that includes the location identified in the target location information. As an example, the first region can be an administrative region such as a city, a state, or a province that contains the location identified by the target location information. The search popularity can be a number of searches or a search frequency reflecting use of the keyword within a preset time period, such as the last 24 hours. The popularity can apply, for example, to number of searches or a search frequency for queries made by users located in the first region, or a search frequency for queries made for content associated with the first region. The first condition may be set by a developer, for example, specifying N for which a search popularity is ranked in top N searches in which the keyword appears.

After receiving the presentation request, the server may acquire keywords having the search popularity ranked in top N in the administrative region for a region defined by the target location information. The server can then use the acquired keywords as the first keywords. It may be understood that the number of the first keywords is N. From 102, method 100 proceeds to 103.

At 103, the first keywords are provided for presentation in the search page. For example, the server may return one or more first keywords to the terminal, such that the terminal can present the first keywords in the search page. After 103, method 100 stops.

Figure 2:
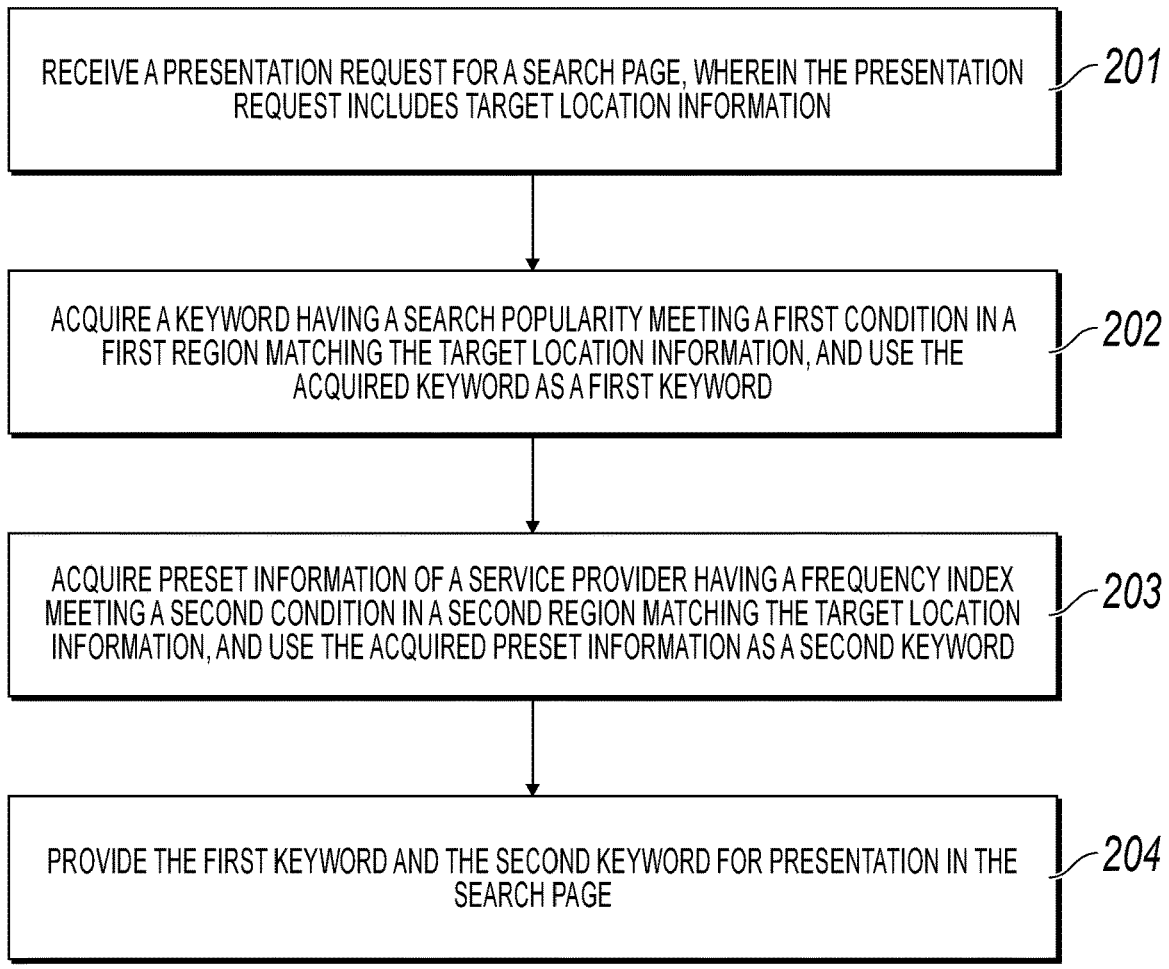
FIG. 2 is a flowchart illustrating an example of another keyword presentation method, according to an implementation of the present disclosure.

FIG. 2 is a flowchart illustrating an example of another keyword presentation method 200, according to an implementation of the present disclosure. The keyword presentation method 200 may be applied to a server, and include the following steps.

At 201, a presentation request for a search page is received, and the presentation request includes target location information. For example, the presentation request can be an option selection (such as to initiate a search query) or some other request for a search page entered by a user using an application (or "App") installed on a terminal to search for information. After the user inputs the presentation request, such as for the search page, the terminal can receive the search page from the server. The terminal can then present the search page to the user, such that the user can use the search page for searching.

In some implementations, the user can input the presentation request for the search page by means of enabling a search function, clicking a search input box, or other some other action. For example, supposing that a search App is installed on the terminal of the user, when the user opens the app, it can be regarded that the presentation request for the search page input by the user is received. In another example, suppose that an App (such as, ALIPAY WALLET) having a search function is installed on the terminal of the user. When the user opens the app, a function page of the App can be presented, and a search button for enabling a search function can be provided on the function page. When the user wants to perform a search using the app, the user can click the search button to input the presentation request for the search page.

The presentation request that is sent to the server can include target location information. For example, the target location information can be current location information of the terminal (such as a current GPS location) or location information selected by the user (such as a country name, a zone improvement plan (ZIP) code, or some other user-selectable or user-enterable location). After receiving the presentation request for the search page, the terminal can acquire the current location information. The terminal can then send the current location information with presentation request to the server. In some implementations, after the terminal receives the presentation request for the search page, if the acquired current location information is different from previously recorded location information, then the terminal can generate prompt information to be presented to the user. In response to the prompt, the user can select or enter the location information. The terminal can then use the location information identified by the user as the target location information included with the presentation request for the search page that is sent to the server. From 201, method 200 proceeds to 202.

At 202, a keyword having a search popularity meeting a first condition in a first region matching the target location information is acquired and used as a first keyword. For example, the first region can be a geographic grid for a region defined by the target location information, such as a region that surrounds the current GPS location of the terminal. The first region can be, for example, an administrative region (such as a city, province, or country) for an area defined by the target location information. In some implementations, the search popularity can be the number of searches or a search frequency using the keyword that have occurred within a preset time period, such as a number of times searching was performed using the keyword within the last 24 hours. In some instances, the first condition can be a threshold set by a developer, for example search popularity for the keyword that is ranked in top N popularities among other keywords.

In some implementations, after receiving the presentation request, the server can acquire one or more keywords having a search popularity ranked in the top N (of keyword popularities) in the administrative region to which the target location information applies. For example, the server can identify keywords having a search popularity ranked within the top three keyword popularities within the last 24 hours in a city contained in an area defined by the target location. In this way, the keywords with a high popularity in the administrative region for a region defined by the target location information can be presented to the user; enhancing the usefulness and relevancy of the keyword presentation.

The acquired one or more keywords can be used as a set of first keywords. From 202, method 200 proceeds to 203.

At 203, preset information of a service provider having a frequency index meeting a second condition in a second region matching the target location information is acquired. The preset information can be, for example, brand information, such as one or more of a shop name, a logo, a phone number, an address, an image, a map, or some other feature associated with the service provider. Service providers can include, for example, merchants, owners of brick-and-mortar locations, or other entities. The preset information can be used as a second keyword.

In some implementations, after receiving a given presentation request, the server can further determine a second region matching the target location information according to offline statistics, such as term frequencies. For example, the server can acquire preset information of a service provider having a frequency index meeting a second condition in the second region, and the acquired preset information can be used as a second keyword.

The second region can be a geographic grid for an area defined by the target location information, or the second region can be an adjacent geographic grid. The frequency index can include parameters obtained through calculation according to features such as popularity and ratings (such as favorability ratings, "Likes," or other indications of approval/disapproval)) associated with the service provider. The second condition can also be set by a developer and can include, for example, frequency indexes that are ranked in top M, where M is a natural number greater than or equal to 1.

In some implementations, the server can generate the geographic grid according to location information of the service provider, such as a physical address of a brick-and-mortar location from which the service provider provides services. For example, the server can collect and maintain statistics that include location information of all merchants. Using the location information, the server can then generate multiple geographic grids, such as through a GeoHash algorithm, according to the location information. Each geographic grid can contain one or more service providers. In some implementations, the server can collect and maintain statistics on location information of merchants throughout the country or other region and set the side length of each geographic grid to 2 kilometers. Using the grids, the server can then map all merchants on which statistics are collected and maintained to the multiple generated geographic grids by using a GeoHash algorithm.

In some implementations, the server can calculate a frequency index of each service provider according to a term frequency-inverse document frequency (TF-IDF) algorithm. For example, the TF-IDF algorithm can be used to calculate a product of a term frequency (TF) multiplied by an inverse document frequency (IDF). In some implementations, the frequency index of a service provider can be equal to a product of a term frequency of the service provider multiplied by an inverse document frequency of the service provider. For example, if the service provider is a merchant, then the TF can be equal to a weighted sum of information such as brand popularity and ratings (such as favorability ratings, "Likes," or other indications of approval/disapproval) associated with the merchant. The IDF, for example, can be equal to a reciprocal of a frequency of appearance of a merchant brand in all the geographic grids. In some implementations, the IDF can be used to downgrade common merchant brands and highlight regionally distinctive merchant brands. The TF can be multiplied by the IDF, for example, to obtain the frequency index of each merchant brand. In general, documents and products associated with the TF-IDF algorithm can apply to all the geographic grids.

In some implementations, acquiring preset information of a service provider having a frequency index meeting a second condition in a second region matching the target location information (and used as a second keyword) can include the following three cases.

In a first case, the second region matching the target location information is a geographic grid for a region defined by the target location information. For example, the brick-and-mortar physical address of a merchant can be determined to be within the second region. In such a case, the server can first determine the geographic grid for a region defined by the target location information, then sequence all service providers in the geographic grid in a descending order of frequency indexes. Using the sequenced set of service providers, the server can select the service providers that are ranked in top M (based on frequency indexes that are ranked in top M, where M is a natural number greater than or equal to 1), and the server can use preset information of the M service providers as the second keywords. The preset information of a given service provider can generally include brand information, such as one or more of a one or more of a shop name, a logo, a phone number, an address, an image, a map, or some other feature associated with the service provider.

In a second case, the second region matching the target location information can be one or more geographic grids adjacent to the target location information. For example, the adjacent grids can include one or more of the closest surrounding adjacent grids. In this case, if the target location information does not belong to any geographic grid, then one or more geographic grids adjacent to the target location information can be selected. Then, all service providers in the one or more geographic grids can be sequenced in a descending order of frequency indexes. Then, service providers ranked in top M can be selected (based on frequency indexes that are ranked in top M, where M is a natural number greater than or equal to 1), and preset information of the M service providers can be used as the second keywords. As an example, eight geographic grids surrounding and adjacent to the grid containing the target location information can be selected by the server. The preset information of the M service providers in the eight geographic grids can be selected in a descending order of frequency indexes as the second keywords.

In a third case, the second region matching the target location information can be the first region. For example, if the target location information does not map to any geographic grid, the first region matching the target location information can be selected. Then, all service providers in the first region can be sequenced in a descending order of frequency indexes. The service providers ranked in top M can then be selected, and preset information of the M service providers can be used as the second keyword. For example, the preset information of M service providers in a city identified by the target location information may be selected at the server in a descending order of frequency indexes, and the preset information can be used as the second keywords.

The server can also collect and maintain statistics on the frequency indexes of all the service providers by using a geographic grid as a base. Target location information can be used to identify the corresponding cell(s) in the geographic grid in order to look up preset information of the service providers having a highest frequency index in the cell. The cells identified in the geographic grid can include cells where the service providers reside or can be adjacent cells. The preset information that is accessed from the geographic grid can be used as second keywords that are presented to the user, thus enhancing accuracy and relevancy of keyword presentation.

In some implementations, the order of steps 202 and 203 can be interchanged, or the steps can occur in parallel. From 203, method 200 proceeds to 204.

At 204, the first keyword and the second keyword are provided for presentation in the search page. For example, after acquiring the first keyword and the second keyword, the server can return the first keyword and the second keyword to the terminal, such as for inclusion in the search page. After 204, method 200 stops.

Figure 3:
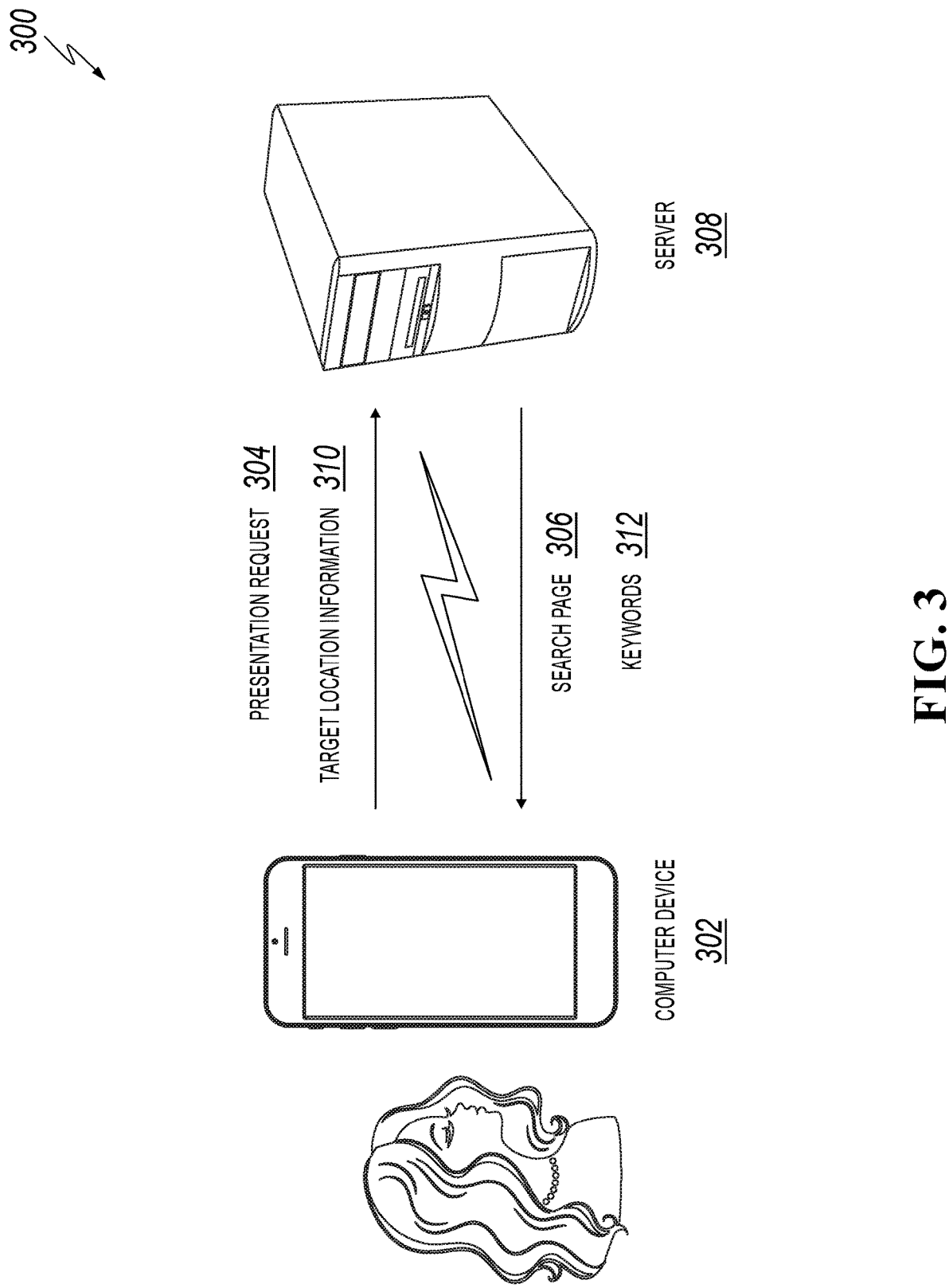
FIG. 3 is a schematic diagram illustrating an example of an application scenario of keyword presentation, according to an implementation of the present disclosure.

FIG. 3 is a schematic diagram illustrating an example of an application scenario 300 of keyword presentation, according to an implementation of the present disclosure. For example, a user of a computer device 302 can launch an application, such as ALIPAY WALLET. The computer device 302 can be, for example, a mobile phone, a personal computer, a laptop computer, or some other computer device on which the user is preparing to perform payment-related actions such as making or receiving a payment. Within the launched application, the user can select (such as by clicking) an "Explore" function, or the user can initiate some other search feature on a function page of the application. The user selection (or initiation) can be regarded as a presentation request 304 for a search page 306 requested by the user and sent to a server 308. The presentation request 304 can also include target location information 310, such as a current location identified automatically by the computer device 302 or a location entered by the user (which may not be the user's current location). In response to the received presentation request 304 and target location information 310, the server 308 can provide the search page 306 and keywords 312 for presentation on the computer device 302. The keywords 312 can be, for example, keyword suggestions that the user can elect to use in the search page 306. The keywords 312 can be identified based on the target location information 310 received from the computer device 302. The application scenario 300 can support and apply to methods 100, 200, and 400.

Figure 4:
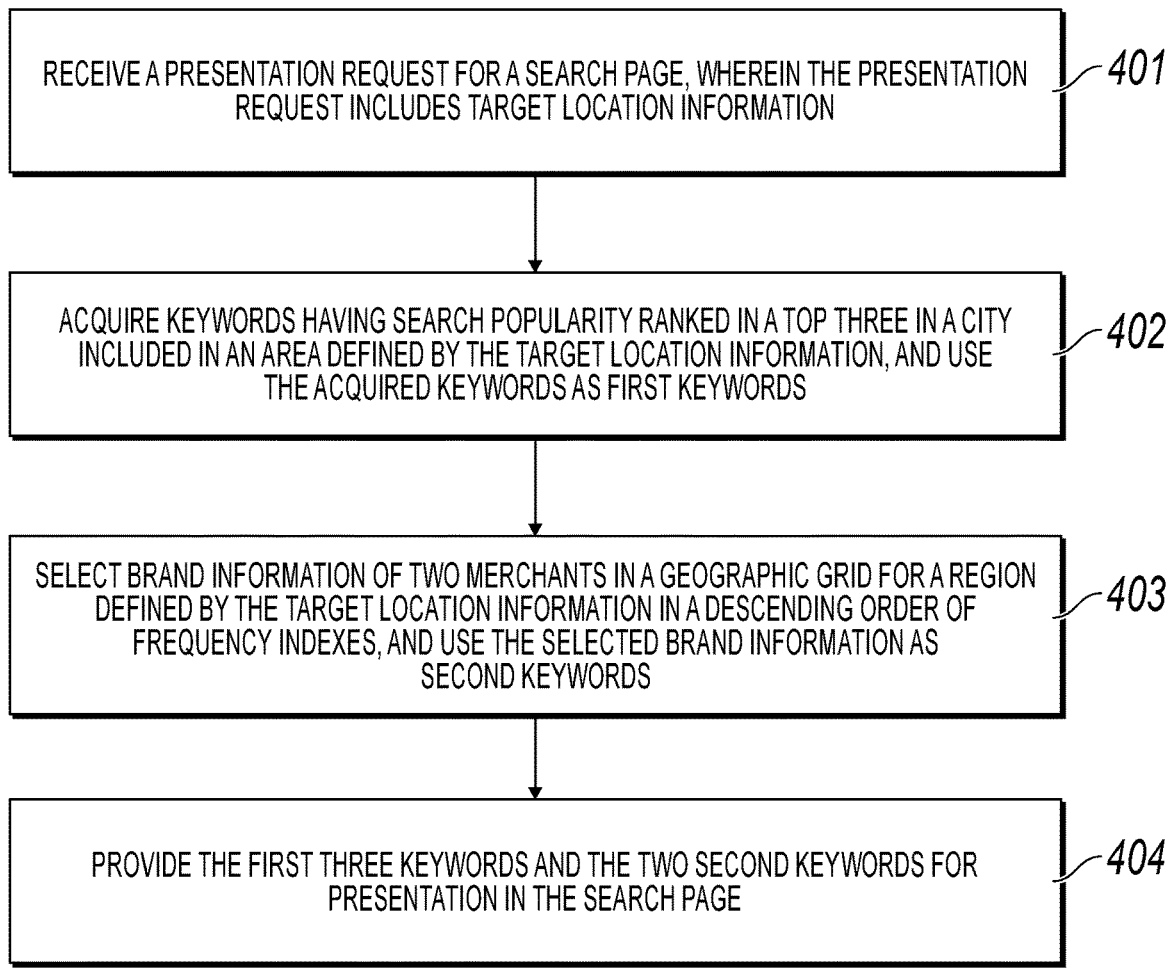
FIG. 4 is a flowchart illustrating an example of another keyword presentation method, according to an implementation of the present disclosure.

FIG. 4 is a flowchart illustrating an example of another keyword presentation method 400, according to an implementation of the present disclosure. The method 400 can correspond to the application scenario 300 described with reference in FIG. 3.

At 401, a presentation request for a search page is received, and the presentation request includes target location information. For example, the presentation request 304 can occur when the user of the computer device 302 initiates the "Explore" feature of the application. The target location information 310 can be the current location of the computer device 302 or a location entered by the user. From 401, method 400 proceeds to 402.

At 402, keywords having search popularity ranked in top the in a city identified by the target location information are acquired as first keywords. For example, using the target location information 310, the server 308 can identify keywords that have recently been popular, such as entered by other users in the city in a recent timeframe, such as the last 24 hours. The keywords can identify popular or trending subjects, places, people, products, or other entities. As an example, if the target location information is Zhongguancun, then the server 308 can acquire first keywords having a search popularity ranked in top three within the last 24 hours in the Zhongguancun region of the city of Beijing. The keywords (which can be single terms or multi-term phrases) can include, for example, Siebel, Diaoye Sirloin, and café. From 402, method 400 proceeds to 403.

At 403, brand information of two merchants, such as names of restaurants or coffee houses, in a geographic grid for a region defined by the target location information can be selected in a descending order of frequency indexes. For example, the brands of the two merchants can be selected from a geographic grid Zhongguancun in which physical locations of the merchants are located (based on street addresses, such as Middle 8th Restaurant and Spice Spirit). The brand information can be used as second keywords. From 403, method 400 proceeds to 404.

At 404, the three first keywords and the two second keywords are presented in the search page. For example, the keywords 312 returned to the computer device 302 by the server 308 can include Siebel, Diaoye Sirloin, café, and Middle 8th Restaurant and Spice Spirit. In this way, the five keywords can be provided for presentation in the search page 306. After 404, method 400 stops.

Figure 5:
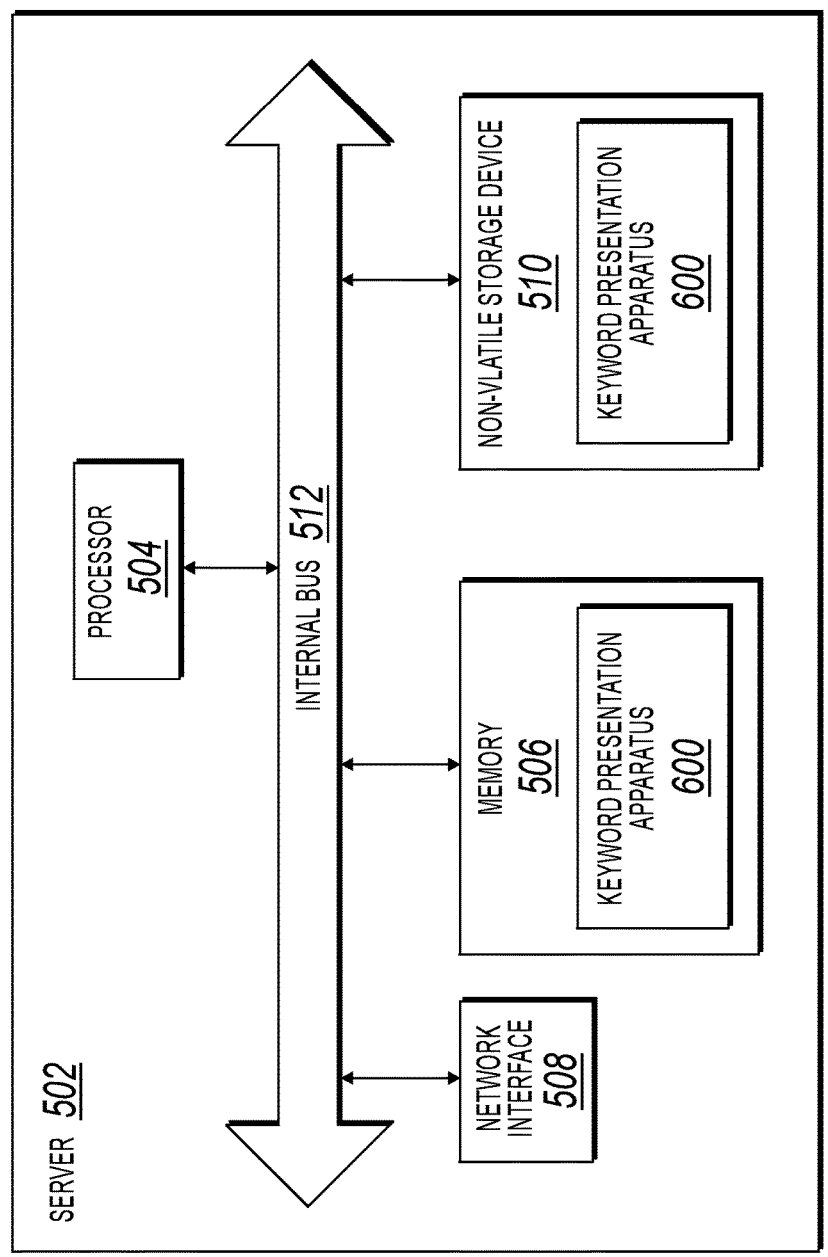
FIG. 5 is a schematic structural diagram illustrating an example of a server, according to an implementation of the present disclosure.

FIG. 5 is a structural diagram illustrating an example of hardware of a server 502 where a keyword presentation system 600 is located, according to an implementation of the present disclosure. In addition to a processor 504, memory 506, a network interface 508, and a non-volatile storage device 510 (all connected by an internal bus 512), the server 502 can also include other hardware according to other functions of the server 502.

Figure 6:
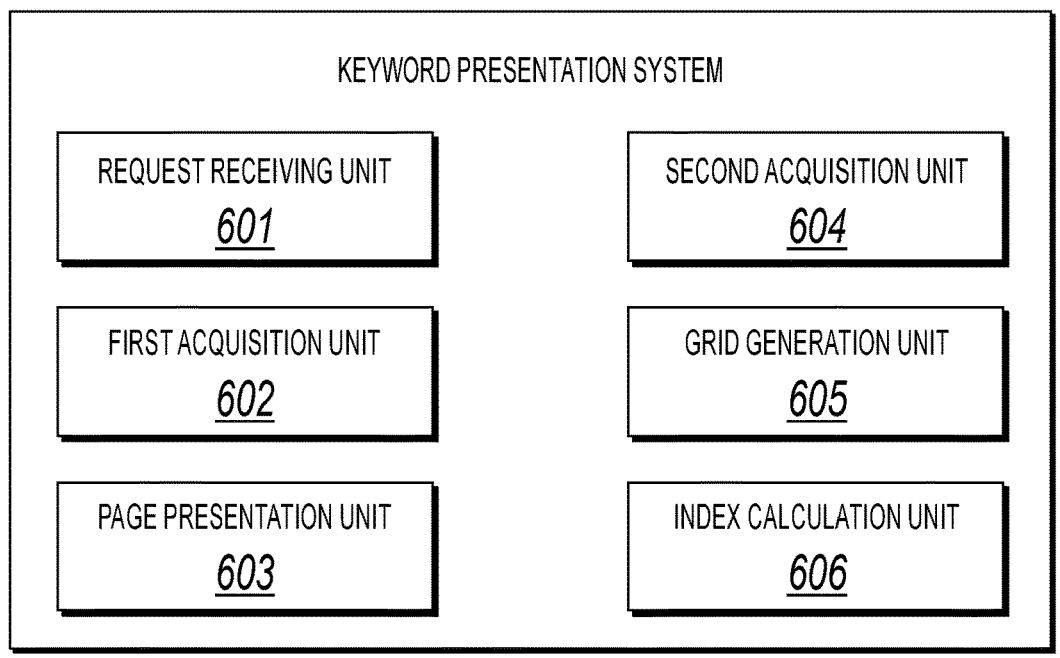
FIG. 6 is a schematic structural diagram illustrating an example of a computer-implemented keyword presentation system, according to an implementation of the present disclosure.

FIG. 6 is a schematic structural diagram illustrating an example of a computer-implemented keyword presentation system 600, according to an exemplary embodiment of the present application. The keyword presentation system 600 can include, for example, a request receiving unit 601 (for receiving presentation requests 304), a first acquisition unit 602 (for identifying first keywords using target location information 310), a page presentation unit 603 (for providing the search page 306), a second acquisition unit 604 (for identifying second keywords using target location information 310), a grid generation unit 605 (for collecting and maintaining information within a geographic grid), and an index calculation unit 606.

The request receiving unit 601, for example, can receive a presentation request 304 for a search page 306, and the presentation request 304 can include the target location information 310.

The first acquisition unit 602, for example, can acquire a keyword having search popularity meeting a first condition in a first region matching the target location information, and the acquired keyword can be used as a first keyword, such as included in keywords 312.

The page presentation unit 603, for example, can provide the first keyword for presentation in the search page 306.

The second acquisition unit 604, for example, can acquire preset information of a service provider having a frequency index meeting a second condition in a second region matching the target location information, and the preset information can be used as a second keyword.

The page presentation unit 603, for example, can provide the first keyword and the second keyword for presentation in the search page 306.

The grid generation unit 605, for example, can generate multiple geographic grids according to location information of the service provider, and each geographic grid can contain one or more service providers. The grid generation unit 605 can also generate a second region in a cell of the geographic grid matching the target location information 310. In some implementations, the grid generation unit 605 can generate, through a GeoHash algorithm, multiple geographic grids according to the location information of the service provider.

In some implementations, when the target location information does not belong to any geographic grid, the second region matching the target location information is one or more geographic grids adjacent to the target location information. In some implementations, when the target location information does not belong to any geographic grid, the second region matching the target location information is the first region.

The index calculation unit 606, for example, can calculate a frequency index of each service provider according to a TF-IDF algorithm.

Figure 7:
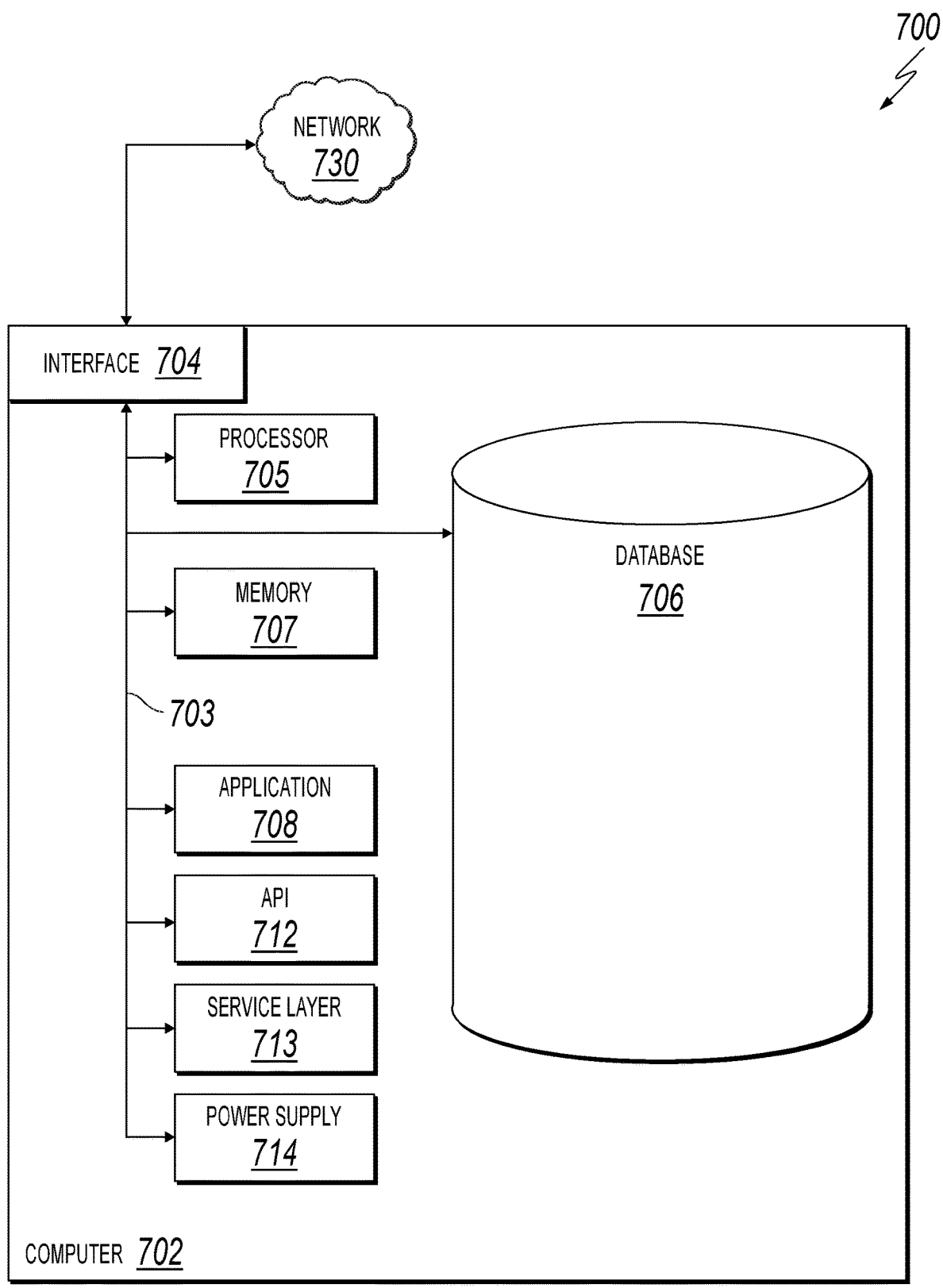
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented system 700 used to provide computational functionalities associated with described algorithms, methods, functions, processes, flows, and procedures, according to an implementation of the present disclosure. In the illustrated implementation, system 700 includes a computer 702 and a network 730.

The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a distributed computing system as a client, network component, a server, a database or another persistency, another role, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, another environment, or a combination of environments.

At a high level, the computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and comprises logic encoded in software, hardware, or a combination of software and hardware. More specifically, the interface 704 can comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702, another component or components communicatively linked to the network 730 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

For example, in a first implementation, a computer-implemented method, comprising: generating multiple geographic grids according to acquired location information of a service provider, wherein each geographic grid contains one or more service providers, and wherein the second region matching the target location information is a geographic grid for a region defined by the target location information; receiving a presentation request for a search page, wherein the presentation request includes target location information; acquiring a keyword having a search popularity meeting a first condition in a first region matching the target location information, and using the acquired keyword as a first keyword; and providing the first keyword for presentation in the search page.

The foregoing and other described implementations can each, optionally, include one or more of the following features:

A first feature, combinable with any of the following features, the computer-implemented method further comprising: acquiring preset information of the service provider having a frequency index meeting a second condition in a second region matching the target location information, and using the acquired preset information as a second keyword; and providing the first keyword and the second keyword for presentation in the search page.

A second feature, combinable with any of the previous or following features, when the target location information does not belong to any geographic grid, the second region matching the target location information is one or more geographic grids adjacent to the target location information.

A third feature, combinable with any of the previous or following features, when the target location information does not belong to any geographic grid, the second region matching the target location information is the first region.

A fourth feature, combinable with any of the previous or following features, generating multiple geographic grids according to location information of the service provider further comprises generating, through a GeoHash algorithm, the multiple geographic grids according to the acquired location information of the service provider.

A fifth feature, combinable with any of the previous or following features, further comprising calculating a frequency index of each service provider according to a term frequency-inverse document frequency (TF-IDF) algorithm.

A sixth feature, combinable with any of the previous or following features, the search popularity is the number of searches or a search frequency within a preset time period A seventh feature, combinable with any of the previous or following features, the target location information is current location information or location information selected by a user.

An eighth feature, combinable with any of the previous or following features, the first region is a geographic grid for a region defined by the target location information.

In a second implementation, a non-transitory, computer-readable medium storing one or more instructions executable by a computer system to perform operations comprising: generating multiple geographic grids according to acquired location information of a service provider, wherein each geographic grid contains one or more service providers, and wherein the second region matching the target location information is a geographic grid for a region defined by the target location information; receiving a presentation request for a search page, wherein the presentation request includes target location information; acquiring a keyword having a search popularity meeting a first condition in a first region matching the target location information, and using the acquired keyword as a first keyword; and providing the first keyword for presentation in the search page.

The foregoing and other described implementations can each, optionally, include one or more of the following features:

A first feature, combinable with any of the following features, further comprising: acquiring preset information of the service provider having a frequency index meeting a second condition in a second region matching the target location information, and using the acquired preset information as a second keyword; and providing the first keyword and the second keyword for presentation in the search page.

A second feature, combinable with any of the previous or following features, when the target location information does not belong to any geographic grid, the second region matching the target location information is one or more geographic grids adjacent to the target location information.

A third feature, combinable with any of the previous or following features, when the target location information does not belong to any geographic grid, the second region matching the target location information is the first region.

A fourth feature, combinable with any of the previous or following features, generating multiple geographic grids according to location information of the service provider further comprises generating, through a GeoHash algorithm, the multiple geographic grids according to the acquired location information of the service provider.

A fifth feature, combinable with any of the previous or following features, further comprising calculating a frequency index of each service provider according to a term frequency-inverse document frequency (TF-IDF) algorithm.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform operations comprising: generating multiple geographic grids according to acquired location information of a service provider, wherein each geographic grid contains one or more service providers, and wherein the second region matching the target location information is a geographic grid for a region defined by the target location information; receiving a presentation request for a search page, wherein the presentation request includes target location information; acquiring a keyword having a search popularity meeting a first condition in a first region matching the target location information, and using the acquired keyword as a first keyword; and providing the first keyword for presentation in the search page.

The foregoing and other described implementations can each, optionally, include one or more of the following features:

A first feature, combinable with any of the following features, further comprising: acquiring preset information of the service provider having a frequency index meeting a second condition in a second region matching the target location information, and using the acquired preset information as a second keyword; and providing the first keyword and the second keyword for presentation in the search page.

A second feature, combinable with any of the previous or following features, when the target location information does not belong to any geographic grid, the second region matching the target location information is one or more geographic grids adjacent to the target location information.

A third feature, combinable with any of the previous or following features, when the target location information does not belong to any geographic grid, the second region matching the target location information is the first region.

A fourth feature, combinable with any of the previous or following features, generating multiple geographic grids according to location information of the service provider further comprises generating, through a GeoHash algorithm, the multiple geographic grids according to the acquired location information of the service provider.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   generating, by a server, multiple geographic grids according to acquired location information of a set of service providers, wherein each geographic grid contains one or more service providers from the set of service providers;
   receiving, by the server and from an electronic device operated by a user, a presentation request for a search page when the user opens a search application installed on the electronic device, wherein the presentation request includes information for a target location corresponding to a location of the electronic device acquired after the user inputs the presentation request at the electronic device; and
   in response to receiving the presentation request for the search page:
      determining, by the server, a first administrative region, wherein the target location resides in the first administrative region;
      obtaining, by the server, a first keyword associated with search popularity, wherein the first keyword has a search popularity meeting a first condition in the first administrative region, and the search popularity of the first keyword includes a search frequency for searching the first keyword within a preset time period in the first administrative region;
      determining, by the server, a second geographic region based on the target location, wherein the second geographic region includes one or more geographic grids of the multiple geographic grids;
      determining, by the server from the set of service providers, one or more service providers contained in the second geographic region;
      selecting, by the server and based on ordering the one or more service providers contained in the second geographic region in a descending order according to frequency indexes associated with each service provider, at least one service provider having a frequency index meeting a second condition in the second geographic region;
      obtaining, by the server, preset information from the at least one service provider as a second keyword, wherein the second keyword includes brand name of the at least one service provider; and
      providing, by the server and to the electronic device, the first keyword and the second keyword for presentation in the search page of the electronic device.

2. The computer-implemented method of claim 1, wherein the second geographic region is a geographic grid for a region defined by the target location.

3. The computer-implemented method of claim 1, wherein when the target location does not belong to any geographic grid, the second geographic region is one or more geographic grids adjacent to the target location.

4. The computer-implemented method of claim 3, wherein when the target location does not belong to any geographic grid, the second geographic region is the first administrative region.

5. The computer-implemented method of claim 3, wherein generating the multiple geographic grids according to the acquired location information of the set of service providers further comprises generating, through a GeoHash algorithm, the multiple geographic grids according to the acquired location information of the set of service providers.

6. The computer-implemented method of claim 3, further comprising calculating a frequency index of each service provider according to a term frequency-inverse document frequency (TF-IDF) algorithm.

7. The computer-implemented method of claim 1, wherein the first administrative region is a city, a state, or a province that contains the target location, and the one or more geographic grids reside in the first administrative region.

8. The computer-implemented method of claim 1, wherein providing the first keyword and the second keyword for presentation in the search page of the electronic device comprises:
   providing three keywords having a search popularity ranked in top three within the preset time period in the first administrative region and two keywords of two service providers ranked in top two in the descending order of the one or more service providers contained in the second geographic region for presentation in the search page of the electronic device, wherein the two keywords includes brand name of the two service providers, respectively.

9. The computer-implemented method of claim 1, wherein the second geographic region is determined after the first keyword is obtained.

10. A non-transitory, computer-readable medium storing one or more instructions executable by one or more computers of a server to perform operations comprising:
   generating, by the server, multiple geographic grids according to acquired location information of a set of service providers, wherein each geographic grid contains one or more service providers from the set of service providers;
   receiving, by the server and from an electronic device operated by a user, a presentation request for a search page when the user opens a search application installed on the electronic device, wherein the presentation request includes information for a target location corresponding to a location of the electronic device acquired after the user inputs the presentation request at the electronic device; and
   in response to receiving the presentation request for the search page:
      determining, by the server, a first administrative region, wherein the target location resides in the first administrative region;
      obtaining, by the server, a first keyword associated with search popularity, wherein the first keyword has a search popularity meeting a first condition in the first administrative region, and the search popularity of the first keyword includes a search frequency for searching the first keyword within a preset time period in the first administrative region;
      determining, by the server, a second geographic region based on the target location, wherein the second geographic region includes one or more geographic grids of the multiple geographic grids;
      determining, by the server from the set of service providers, one or more service providers contained in the second geographic region;
      selecting, by the server and based on ordering the one or more service providers contained in the second geographic region in a descending order according to frequency indexes associated with each service provider, at least one service provider having a frequency index meeting a second condition in the second geographic region;
      obtaining, by the server, preset information from the at least one service provider as a second keyword, wherein the second keyword includes brand name of the at least one service provider; and
      providing, by the server and to the electronic device, the first keyword and the second keyword for presentation in the search page of the electronic device.

11. The non-transitory, computer-readable medium of claim 10, wherein the second geographic region is a geographic grid for a region defined by the target location.

12. The non-transitory, computer-readable medium of claim 10, wherein when the target location does not belong to any geographic grid, the second geographic region is one or more geographic grids adjacent to the target location.

13. The non-transitory, computer-readable medium of claim 12, wherein when the target location does not belong to any geographic grid, the second geographic region is the first administrative region.

14. The non-transitory, computer-readable medium of claim 12, wherein generating the multiple geographic grids according to the acquired location information of the set of service providers further comprises generating, through a GeoHash algorithm, the multiple geographic grids according to the acquired location information of the set of service providers.

15. The non-transitory, computer-readable medium of claim 12, the operations further comprising calculating a frequency index of each service provider according to a term frequency-inverse document frequency (TF-IDF) algorithm.

16. A computer-implemented system, comprising:
   one or more computers of a server; and
   one or more computer memory devices interoperably coupled with the one or more computers and having tangible, non-transitory, machine-readable media storing one or more instructions that, when executed by the one or more computers, perform operations comprising:
      generating, by the server, multiple geographic grids according to acquired location information of a set of service providers, wherein each geographic grid contains one or more service providers from the set of service providers;
      receiving, by the server and from an electronic device operated by a user, a presentation request for a search page when the user clicks a search button displayed on the electronic device, wherein the presentation request includes information for a target location corresponding to a location of the electronic device acquired after the user inputs the presentation request at the electronic device; and
      in response to receiving the presentation request for the search page:
         determining, by the server, a first administrative region, wherein the target location resides in the first administrative region;
         obtaining, by the server, a first keyword associated with search popularity, wherein the first keyword has a search popularity meeting a first condition in the first administrative region, and the search popularity of the first keyword includes a search frequency for searching the first keyword within a preset time period in the first administrative region;

determining, by the server, a second geographic region based on the target location, wherein the second geographic region includes one or more geographic grids of the multiple geographic grids;

determining, by the server from the set of service providers, one or more service providers contained in the second geographic region;

selecting, by the server and based on ordering the one or more service providers contained in the second geographic region in a descending order according to frequency indexes associated with each service provider, at least one service provider having a frequency index meeting a second condition in the second geographic region;

obtaining, by the server, preset information from the at least one service provider as a second keyword, wherein the second keyword includes brand name of the at least one service provider; and providing, by the server and to the electronic device, the first keyword and the second keyword for presentation in the search page of the electronic device.

17. The computer-implemented system of claim 16, wherein the second geographic region is a geographic grid for a region defined by the target location.

18. The computer-implemented system of claim 16, wherein when the target location does not belong to any geographic grid, the second geographic region is one or more geographic grids adjacent to the target location.

19. The computer-implemented system of claim 18, wherein when the target location does not belong to any geographic grid, the second geographic region is the first administrative region.

20. The computer-implemented system of claim 18, wherein generating the multiple geographic grids according to the acquired location information of the set of service providers further comprises generating, through a GeoHash algorithm, the multiple geographic grids according to the acquired location information of the set of service providers.

\* \* \* \* \*